3,775,342
PROCESS FOR THE PRODUCTION OF CATALYSTS
FOR MAKING VINYL ESTERS
Walter Kronig and Gerhard Scharfe, Leverkusen, Germany, assignors to Bayer Aktiengesellschaft, Leverkusen, Germany
No Drawing. Original application Jan. 29, 1969, Ser. No. 795,027, now abandoned. Divided and this application Dec. 29, 1971, Ser. No. 213,741
Claims priority, application Germany, Feb. 1, 1968, P 16 68 088.9; Sept. 28, 1968, P 17 93 519.2
Int. Cl. C07c 67/04
U.S. Cl. 252—430                                                  40 Claims

ABSTRACT OF THE DISCLOSURE

Highly active catalysts for the preparation of catalysts suitable for vinyl ester, e.g., vinyl acetate, production are prepared by treating a catalyst support, simultaneously or in either sequence, with or without intermediate drying, with: (A) a solution of noble metals containing at least salts of palladium and gold, and (B) a solution containing compounds, e.g., bases such as sodium hydroxide, which are able to react with the noble metal salts of the solution (A) to form water insoluble noble metal compounds; impregnating the catalyst support with such quantities of solutions (A) and (B) corresponding to from 10 to 110% of the absorptive capacity of the catalyst support for these solutions; subjecting the impregnated catalyst support to a time temperature treatment such that at least 95% of the impregnated palladium and gold are transformed into water insoluble noble metal compounds; reducing the metal compounds to the noble metal with a reducing agent, e.g., ethylene or hydrazine; removing the water-soluble compounds which are contained in the catalyst by washing before or after the reduction step; and optionally treating the resulting catalyst with an alkali metal carboxylate, e.g., acetate, before or after the treatment with the reducing agent.

---

This application is a divisional application of Ser. No. 795,027, filed Jan. 29, 1969, and now abandoned.

This invention relates to a process for the production of vinyl esters.

It is known to produce vinyl esters by reacting ethylene, certain carboxylic acids and molecular oxygen or air in the gas phase at temperatures of from 100 to 250° C. and at normal or elevated pressure in the presence of supported catalysts which contain palladium. Such a process has been described, for example, in German patent specification Nos. 1,185,604 and 1,196,644, German Auslegeschrift No. 1,244,766, and Belgian patent specification Nos. 671,895 and 671,896.

We have now found that particularly active supported catalysts containing palladium and gold for the production of vinyl esters from ethylene, lower carboxylic acids with 2 to 4 carbon atoms and oxygen in the gas phase at elevated temperature and at normal or elevated pressure are obtained by the following process. The catalyst support is treated simultaneously or successively, with or without intermediate drying, with a solution A and a solution B, the solution A containing dissolved salts of palladium and gold and optionally salts of other metals, and the solution B containing compounds which are able to react on the catalyst support with the noble metal salts of the solution A to form water-insoluble noble metal compounds which are practically free from halogen, sulphur and nitrogen; the solution A or B or the common solution of A and B is impregnated on the catalyst support in quantities which correspond to from 10 to 110% of the absorptive capacity of the catalyst support for these solutions; the catalyst support with the impregnated solutions A and B is subjected to a time/temperature treatment which is such that 95% at least of the impregnated palladium and 95% at least of the impregnated gold are transformed into water-insoluble noble metal compounds; the water-insoluble noble metal compounds are largely transformed by a treatment with reducing agents into the noble metals and the water-soluble compounds which are contained in the catalyst are removed by washing before or after the reduction.

In a preferred embodiment of the process, alkali metal carboxylates, especially alkali metal acetates, are applied on the catalyst before or after the treatment with reducing agents in such quantities that the catalyst, after being dried, contains from 1 to 30% by weight of alkali metal carboxylate. Examples of the alkali metal carboxylates include sodium formate potassium acetate, sodium acetate, lithium acetate, potassium propionate and potassium butyrate.

The following detailed explanations are given for carrying out in such a way that, for example, firstly the catalyst support is impregnated with the solution A, which is then optionally dried, and then it is impregnated with the solution B. However, it is also possible firstly to impregnate the support with the solution B, optionally followed by drying, and then to impregnate it with the solution A. Furthermore, the solutions A and B can be mixed and the support may be impregnated with the common solution.

The solution A or the solution B or the common solution of A and B is used in quantities which correspond from 10 to 110%, advantageously 90–100%, of the absorptive capacity of the catalyst support. It is preferred to use water as a solvent for the solutions A and B, but it is also possible to employ suitable organic or aqueous-organic solvents.

For example, palladium chloride, sodium-palladium chloride, palladium nitrate and palladium sulphate can serve as palladium salts in solution A, and, for example, auric chloride and tetrachloroauric acid can be employed as gold salts in the solution. In the process according to the invention, it is advantageous to use the generally accessible tetrachloroauric acid and sodium-palladium chloride, which have good water-solubility. The solution A can optionally also contain salts of other metals, for example of magnesium, calcium, barium, rare earths, chromium, molybdenum, tungsten, manganese, rhenium, iron, cobalt, nickel, ruthenium, rhodium, iridium, platinum and copper.

The compounds in solution B can, for example, consist of alkali metal hydroxides, alkali metal bicarbonates and alkali metal carbonates, and these can be used by themselves or as a mixture.

Substances which, under the reaction conditions, do not lose their mechanical strength under the influence of acetic acid are particularly suitable as catalyst supports. Silicic acid and silicates are, for example, suitable. The catalyst supports can vary within wide limits as regards their physical properties.

Physical properties in the following range are, for example, suitable: absorptive capacity from 100–1000 g. of water per kg. of catalyst support, internal surface according to BET of 50–200 m.$^2$/g. and a mean pore diameter of from 100 to 500 A.

The reaction of the compounds of solution B with the noble metal salts of solution A can, for example, be described by the stoichiometric equations:

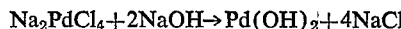
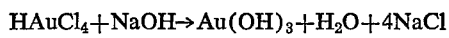

The following explanations are also given concerning the process according to the invention: the quantities of the compounds contained in the solution B are preferably such that they are at least sufficient for the stoichiometric reaction with the salts contained in the solution A to form water-insoluble noble metal compounds. However, the compounds in the solution B can also be employed in excess, for example in 1–10 times the quantity which is stoichiometrically necessary. The reaction of the compounds in the solution B with the noble metal salts of the solution A to form insoluble noble metal compounds takes place on the support, either quickly or slowly, according to the conditions which are used. Other compounds which influence the speed of the reaction can be added to the solution B, e.g. salts of weak acids and strong bases or salts of strong acids and weak bases, for example, sodium acetate or sodium phosphates. If the solutions A and B are mixed before being used for impregnation, there is generally a precipitation of water-insoluble noble metal compounds after a certain time. In this case, the impregnation with the common solution is preferably effected before the precipitation of the water-insoluble noble metal compounds. The reaction of the compounds of solution B with the noble metal salts of solution A on the support is generally completed after about 24 hours. Then 95% at least of the palladium and 95% at least of the gold are converted into water-insoluble noble metal compounds.

In carrying out the process according to the invention, the reaction of the solutions on the support can be performed at normal or elevated temperature, for example 70° C. After the reaction is complete, the water-soluble compounds which are contained in the catalyst support, e.g. akali metal chlorides and also any excess of the compounds contained in solution B which may be present, are removed by washing with water. The catalyst washed with water is treated with alkali metal carboxylate solutions, so that the catalyst, after drying, contains from 1 to 30% by weight of alkali metal carboxylate. The water-washed catalyst can be dried before the treatment with alkali metal carboxylates, whereupon the latter can be applied for impregnation purposes as a solution.

The alkali metal carboxylates can also be applied by introducing solutions containing alkali metal carboxylates into the hot gas stream before the reactor, and then vaporizing the solutions together with the alkali metal carboxylates so that the alkali metal carboxylates are supplied in gaseous form to the catalyst.

The water-insoluble noble metal compounds contained in the catalyst after the time/temperature treatment are treated with reducing agents. This can take place before or after the washing to remove the water-soluble compounds and before or after the application of the alkali metal compounds.

The reduction can be effected in liquid phase, e.g. with aqueous ethylene hydrate, or in the gas phase, e.g. with hydrogen, ethylene or methanol vapours. The reduction can be carried out under normal or elevated temperature, and at normal or elevated pressure. Preferred procedures as regards the reduction according to the invention are the treatment of the water-washed catalyst with ethylene at 100–200° C. and pressures of from 1–10 atm. gauge, or the treatment of the catalyst which has not been washed with water and prior to the washing with aqueous or aqueous alkaline hydrazine solutions at normal pressure at room temperature. The prepared catalyst advantageously contains from 0.5 to 6.0 g. of palladium and from 0.1 to 3.0 g. of gold per litre of the catalyst (bulk volume).

Instead of applying alkali metal carboxylates to the catalyst, it is also possible to start with alkali metal compounds which are transformed wholly or in part into alkali metal carboxylates under the reaction conditions, such as alkali metal hydroxides, carbonates, borates and phosphates. Lower carboxylic acids with 2–4 carbon atoms include acetic acid, propionic acid, isobutyric acid and n-butyric acid.

The invention is illustrated by the following examples.

EXAMPLE 1

The catalyst was prepared in the following manner: 1 litre of a silicic acid support with an internal surface area of 130 m.$^2$/g., a weight per unit volume of 0.5 g./cc. and an absorptive capacity of 400 ml. of water per litre of catalyst support was evacuated in a shaker-type vessel and then impregnated, while shaking, with 390 ml. of an aqueous solution of $Na_2PdCl_4$ and $HAuCl_4$, which corresponded to a quantity of 3.3 g. of Pd and 1.5 g. of Au. The catalyst was thereafter dried in a rotary evaporator under a water jet vacuum. The dried catalyst was evacuated in a shaker-type vessel and treated while shaking with a solution of 6 g. of NaOH in 390 ml. of water. The catalyst was left to stand for 16 hours at room temperature and then washed for 24 hours with distilled water. By analysing the washing water, it was found that more than 99% of the palladium introduced and more than 98% of the gold had been converted into water-insoluble compounds. The catalyst was dried, whereupon it was impregnated with 30 g. of potassium acetate as an aqueous solution, and the catalyst was dried again. Finally, the catalyst was reduced at 150° C. and at 5 atm. gauge for 24 hours in a stream of ethylene. 2,330 ml. of the catalyst thus prepared were introduced into a reaction tube having a length of 5 m. and an internal diameter of 25 mm. 51.7 mols of acetic acid, 169.5 mols of ethylene and 16.6 mols of oxygen per hour in gaseous form were then conducted at the inlet of the reactor over the catalyst at 176° C. and a pressure of 5.3 atm. gauge. 452 g. of vinyl acetate were formed hourly per litre of catalyst. Of the ethylene reacted, 91.6% had been converted into vinyl acetate and 8.4% into carbon dioxide.

EXAMPLE 2

The catalyst was prepared in the following manner: 1 litre of the catalyst support of Example 1 was impregnated with 400 ml. of an aqueous solution containing 12 g. of NaOH and dried, whereupon it was impregnated with 380 ml. of an aqueous solution of $Na_2PdCl_4$ and $HAuCl_4$, which corresponds to an amount of 3.3 g. of Pd and 1.5 g. of Au. The catalyst was left standing for 24 hours at room temperature. Washing of the catalyst, impregnation with alkali metal acetate and reduction with ethylene were carried out in the same manner as in Example 1. Under the same reaction conditions as in Example 1, results were obtained with the catalyst which are comparable with those of Example 1.

EXAMPLE 3

The catalyst was prepared in the following manner: An aqueous solution of $Na_2PdCl_4$ and $HAuCl_4$ was added while stirring to a solution of 42 g. of $K_2CO_3$ in water. The combined solution was diluted with water to 390 ml. and 1 litre of the catalyst support referred to in Example 1 was impregnated therewith. The catalyst was left standing for 16 hours at room temperature. Washing of the catalyst, impregnation with alkali metal acetate and reduction with ethylene took place in the same way as in Example 1. Under the same reaction conditions as in Example 1, results were obtained with the catalyst which are comparable with those of Example 1.

EXAMPLE 4

The catalyst was prepared as in Example 1, but a support was used which had an internal surface of 165 m.$^2$/g.; before the catalyst was impregnated with potassium acetate, it was reduced for 4 hours with ethylene at 150° C., without using pressure. 2,330 ml. of the catalyst thus prepared were placed in a reaction tube with a length of 5 m. and an internal diameter of 25 mm. 200 mols of ethylene, 60 mols of acetic acid and 15 mols of oxygen per hour were conducted in gaseous form over the catalyst, with a pressure of 8.2 atm. gauge at the inlet to the reactor. The gas was heated before entering the reactor in a superheater to the reaction temperature.

A solution of potassium acetate in acetic acid was continuously pumped into the reactor and vaporized. 10 p.p.m. of potassium as potassium acetate based on the amount of acetic acid introduced at the inlet of the reactor were continuously supplied to the reactor. The test was carried out over a period of 2,100 hours. During this time, the reaction temperature was raised from 156 to 168° C. On average, throughout the entire test, 380 g. of vinyl acetate were formed per litre of catalyst and per hour. Of the reacted ethylene, 96% was converted to vinyl acetate and 4% to carbon dioxide.

EXAMPLE 5

The catalyst was prepared as in Example 4, but, before impregnating the catalyst with potassium acetate, it was reduced with an aqueous hydrazine solution, washed with water and dried.

900 ml. of the catalyst thus obtained were introduced into a reaction tube with a length of 2 m. and an internal diameter of 25 mm. 77 mols of ethylene, 19 mols of acetic acid and 5.8 mols of oxygen per hour were conducted in gaseous form over the catalyst at 140° C. and at a pressure of 8 atm. gauge, 235 g. of vinyl acetate were formed per litre of catalyst and per hour. Of the reacted ethylene, 97.7% was converted to vinyl acetate and 2.3% to carbon dioxide.

EXAMPLE 6

The catalyst was prepared in the following manner: 1 litre of a silicic acid support with an internal surface of 165 m.$^2$/g., a weight per unit volume of 0.5 g./cc. and an absorptive capacity of 400 ml. of water per litre of catalyst support was evacuated in a shaker-type vessel and then impregnated, while shaking, with 390 ml. of an aqueous solution of $Na_2PdCl_4$ and $HauCl_4$, which corresponded to a quantity of 3.3 g. of Pd and 1.5 g. of Au. The catalyst was thereafter dried in a rotary evaporator under a water jet vacuum. The dried catalyst was evacuated in a shaker-type vessel and treated while shaking with a solution of 6 g. of NaOH in 390 ml. of water. The catalyst was left to stand for 16 hours at room temperature and was then washed for 24 hours with distilled water. By analysing the washing water, it was found that more than 99% of the palladium introduced and more than 98% of the gold introduced had been converted into water-insoluble compounds. The catalyst was then dried, whereupon it was impregnated with 30 g. of potassium acetate as an aqueous solution, and was then dried again. Finally, the catalyst was reduced at 150° C. and at 5 atm. gauge for 24 hours in a stream of ethylene. 900 ml. of the catalyst thus prepared were introduced into a reaction tube having a length of 2 m. and an internal diameter of 24 mm. 6.3 mols of propionic acid, 84 mols of ethylene and 6.2 mols of oxygen per hour in gaseous form were then conducted over the catalyst at 140° C. and an inlet-pressure of 8 atm. gauge. 289 g. of vinyl acetate were formed every hour per litre of catalyst. Of the ethylene reacted, 96% had been converted into vinyl acetate and 4% into carbon dioxide.

EXAMPLE 7

The catalyst was prepared as in Example 6, but using a silicic acid support with an internal surface of 130 m.$^2$/g. and treating the catalyst, after the treatment with the sodium hydroxide solution, with an aqueous hydrazine solution at room temperature. The catalyst was thereafter washed with water, dried and then coated with potassium acetate, as in Example 6. 900 ml. of the catalyst thus obtained were introduced into a reaction tube with a length of 2 m. and an internal diameter of 25 mm. 6.3 mol of isobutyric acid, 84 mols of ethylene and 6.2 mols of oxygen were hourly conducted in gaseous form over the catalyst at 150° C. and at a pressure of 5 atm. gauge. 190 g. of vinyl isobutyrate were formed per litre of catalyst per hour. Of the reacted ethylene, 96% was converted to vinyl isobutyrate and 4% to carbon dioxide.

What is claimed is:

1. Process for the preparation of a catalyst suitable for the production of vinyl esters by reacting ethylene, lower carboxylic acids with 2 to 4 carbon atoms and oxygen in the gas phase at elevated temperature and normal or elevated pressure, in the presence of supported catalysts containing from about 0.5 to 6 grams of palladium and from about 0.1 to 3.0 grams of gold per liter of catalyst, which process comprises preparing the catalyst by impregnating the catalyst support, simultaneously or successively or in combination with a solution A and a solution B, the solution A containing dissolved salts of palladium and gold and the solution B containing compounds which are able to react on the catalyst support with the noble metal salts of the solution A to form water-insoluble noble metal compounds which are substantially free of halogen, sulfur and nitrogen, and where-in said impregnating of the catalyst support with the said solutions is effected in quantities of solutions A and B which correspond to from 10 to 110% of the absorptive capacity of the catalyst support for these solutions; subjecting the catalyst support impregnated with the solutions A and B to a time/temperature treatment which is such that at least 95% of the impregnated palladium and at least 95% of the impregnated gold is transformed into water-insoluble noble metal compounds; treating the water-insoluble noble metal compounds with a reducing agent to convert those compounds substantially into the corresponding noble metals; and removing the water-soluble compounds which are contained in the catalyst by washing before or after the reduction step.

2. Process for the preparation of a catalyst suitable for the production of vinyl esters by reacting ethylene, lower carboxylic acids with 2 to 4 carbon atoms and oxygen in the gas phase at elevated temperature and normal or elevated pressure, in the presence of supported catalysts containing from about 0.5 to 6 grams of palladium and from about 0.1 to 3.0 grams of gold per liter of catalyst, which process comprises preparing the catalyst by impregnating the catalyst support, first with a solution A and then with a solution B, the solution A containing dissolved salts of palladium and gold and the solution B containing compounds which are able to react on the catalyst support with the noble metal salts of the solution A to form water-insoluble metal compounds which are substantially free of halogen, sulfur and nitrogen, and wherein said sequential impregnating of the catalyst support with the said solutions is effected in quantities of solutions A and B which correspond to from 10 to 110% of the absorptive capacity of the catalyst support for these solutions; subjecting the catalyst impregnated with the solutions A and B to a time/temperature treatment whereafer substantially all of the impregnated palladium and gold are transformed into water-insoluble noble metal compounds; treating the water-insoluble noble metal compounds with a reducing agent to convert those compounds substantially into the corresponding noble metals and removing the water-soluble compounds which are contained in the catalyst by washing.

3. Process as claimed in claim 2 wherein the catalyst support is also impregnated with an alkali metal acetate.

4. Process as claimed in claim 3 wherein the alkali metal acetate impregnation is carried out after said removing of the water-soluble compounds by washing.

5. Process as claimed in claim 3 wherein said alkali metal acetate is sodium acetate.

6. Process as claimed in calim 3 wherein said alkali metal acetate is potassium acetate.

7. Process as claimed in claim 2 wherein solution A is a solution of palladium and gold salts.

8. Process as claimed in claim 7 wherein the salts are chlorides.

9. Process as claimed in claim 7 wherein solution A is an aqueous solution of sodium-palladium chloride (Na$_2$PdCl$_4$) and tetrachloroauric acid (HAuCl$_4$).

10. Process as claimed in claim 7 wherein that portion of solution A which is absorbed by the support contains the equivalent of from about 0.5 to 6 grams of palladium and from about 0.1 to 3 grams of gold, per litre of catalyst.

11. Processed as claimed in claim 2 wherein solution B is an aqueous solution of an alkali metal hydroxide, bicarbonate, or carbonate.

12. Process as claimed in claim 11 wherein solution B is an aqueous solution of sodium hydroxide.

13. Process as claimed in claim 2 wherein the catalyst is dried intermediate the treatment with solution A and the treatment with solution B.

14. Process as claimed in claim 2 wherein said time/temperature treatment comprises letting the catalyst stand at about room temperature.

15. Process as claimed in claim 2 wherein at least 95% of the impregnated palladium and at least 95% of the impregnated gold exist in the form of their water-insoluble compounds subsequent to said time/temperature treatment.

16. Process as claimed in claim 2 wherein the reducing agent is an aqueous hydrazine solution.

17. Process as claimed in claim 16 wherein the catalyst is washed and dried after the reducing treatment with said aqueous hydrazine solution.

18. Process as claimed in claim 17 wherein the catalyst is, after being washed and dried, impregnated with an alkali acetate in an amount of from 1 to 30 percent by weight, based on the weight of dry supported catalyst.

19. Process as claimed in claim 2 wherein said reducing agent is ethylene and the reducing treatment is carried out at from 100° C. to 200° C.

20. Process as claimed in claim 19 wherein the catalyst is washed and dried before the reducing treatment with ethylene.

21. Process as claimed in claim 19 wherein the catalyst is, after being washed and dried, impregnated with an alkali metal acetate in an amount of from 1 to 30 percent by weight, based on the weight of the dry supported catalyst.

22. Process as claimed in claim 2 wherein the catalyst support is treated first with an aqueous solution of sodium-palladium chloride and tetrachloroauric acid and dried, then treated with a molar excess of aqueous sodium hydroxide solution, wherein each of the solutions is applied in a quantity corresponding to 90 to 100% of the absorptive capacity of the carrier and to provide from 0.5 to 6 grams of palladium and from 0.1 to 3 grams of gold per liter of catalyst, letting the thus-impregnated catalyst support stand so that after such standing at least 95% of the impregnated palladium and at least 95% of the impregnated gold exist in the form of their water-insoluble compounds, reducing said water-insoluble noble metal compounds with aqueous hydrazine to convert those compounds substantially into metallic palladium and gold, washing the resulting catalyst with water to remove the water-soluble compounds, drying the catalyst and then impregnating the supported catalyst with from 1 to 30% by weight of an alkali metal acetate.

23. Process as claimed in claim 2 wherein the catalyst support is treated first with an aqueous solution of sodium-palladium chloride and tetrachloroauric acid and dried, then treated with a molar excess of aqueous sodium hydroxide solution, wherein each of the solutions is applied in a quantity corresponding to from 90 to 100% of the absorptive capacity of the carrier and to provide from 0.5 to 6 grams of palladium and from 0.1 to 3 grams of gold per liter of catalyst, letting the thus-impregnated catalyst support stand so that after such standing at least 95% of the impregnated palladium and at least 95% of the impregnated gold exist in the form of their water-insoluble compounds, washing with water to remove the water-soluble compounds, drying the catalyst, reducing said water-insoluble noble metal compounds with ethylene at from 100° to 200° C. to convert those compounds substantially into metallic palladium and gold, and then impregnating the supported catalyst with from 1 to 30% by weight of an alkali metal acetate.

24. Process for the preparation of a catalyst suitable for the production of vinyl esters by reacting ethylene, lower carboxylic acids with 2 to 4 carbon atoms and oxygen in the gas phase at elevated temperature and normal or elevated pressure, in the presence of a supported noble metal catalyst containing from about 0.5 to 6 grams of palladium and from about 0.1 to 3.0 grams of gold per liter of catalyst, which process comprises preparing the catalyst by impregnating the catalyst support first with a solution B and then with a solution A, the solution A containing dissolved salts of palladium and gold and the solution B containing compounds which are able to react on the catalyst support with the noble metal salts of the solution A to form water-insoluble noble metal compounds which are substantially free of halogen, sulfur and nitrogen, and wherein said impregnating of the catalyst support with the said solutions is effected in quantities of solutions A and B which correspond to from 10 to 110% of the absorptive capacity of the catalyst support for these solutions; subjecting the catalyst support impregnated with the solutions B and A to a time/temperature treatment whereafter substantially all of the impregnated palladium and gold are transformed into water-insoluble noble metal compounds; treating the water-insoluble noble metal compounds with a reducing agent to convert those compounds substantially into the corresponding noble metals and removing the water-soluble compounds which are contained in the catalyst by washing before or after the reduction step.

25. Process as claimed in claim 24 wherein the catalyst support is an inert carrier.

26. Process as claimed in claim 24 wherein the catalyst support is silica.

27. Process as claimed in claim 24 wherein the noble metal in said noble metal catalyst is an admixture of palladium and gold.

28. Process as claimed in claim 24 wherein solution B is a solution of a base.

29. Process as claimed in claim 28 wherein the base is sodium hydroxide.

30. Process as claimed in claim 28 wherein the base is sodium carbonate.

31. Process as claimed in claim 24 wherein the quantity of solution B used to impregnate the catalyst support is from 90 to 100% of the absorptive capacity of the catalyst support.

32. Process as claimed in claim 24 wherein the quantity of solution B used to impregnate the catalyst support is from 10 to 90% of the absorptive capacity of the catalyst support.

33. Process as claimed in claim 24 wherein the catalyst support is dried, after impregnation with solution B to result in a quantity of solution B on the support corresponding to from 90 to 100% of the absorptive capacity of the support.

34. Process as claimed in claim 24 wherein the catalyst support is dried, after impregnation with solution B, to result in a quantity of solution B on the support corresponding to from 10 to 90% of the absorptive capacity of the support.

35. Method as claimed in claim 24 wherein a catalyst support is treated with a solution of a base so that from 10 to 90% of the absorptive capacity of the support is saturated, and then treating the resulting impregnated catalyst support with a solution of noble metal salts containing palladium and gold salts, letting the resulting catalyst stand so that substantially all of the deposited noble metals is transformed into water-insoluble noble metal compounds, and reducing these compounds with a reducing agent to deposit said noble metals on said catalyst support.

36. Process as claimed in claim 1 wherein the said solution A and solution B are applied simultaneously or in combination to the catalyst support.

37. Process as claimed in claim 36 wherein solutions A and B are applied separately but simultaneously to the catalyst support.

38. Process as claimed in claim 36 wherein said solutions A and B are combined and the resulting combined solution is applied to the catalyst support prior to precipitation of water-insoluble noble metal compounds from the combined solution.

39. Catalyst for the production of vinyl acetate by reacting ethylene, lower carboxylic acids with 2 to 4 carbon atoms and oxygen in the gas phase at elevated temperature and normal or elevated pressure, in the presence of a supported catalyst containing palladium and gold, prepared by the process claimed in claim 2.

40. Catalyst for the production of vinyl acetate by reacting ethylene, lower carboxylic acids with 2 to 4 carbon atoms and oxygen in the gas phase at elevated temperature and normal or elevated pressure in the presence of a supported catalyst containing palladium and gold, prepared by the process claimed in claim 24.

References Cited

UNITED STATES PATENTS

| | | | |
|---|---|---|---|
| 3,488,295 | 1/1970 | Sennenald et al. | 260—497 A X |
| 3,442,973 | 5/1969 | Sinfelt et al. | 252—474 X R |
| 3,579,569 | 5/1971 | Montgomery et al. | 252—466 Pe X |

PATRICK P. GARVIN, Primary Examiner

U.S. Cl. X.R.

252—460, 474; 260—497 A